United States Patent
Gu et al.

(10) Patent No.: US 9,951,188 B2
(45) Date of Patent: Apr. 24, 2018

(54) ORGANOTIN CONTAINING HYPERBRANCHED POLYSILOXANE STRUCTURE AND PREPARATION METHOD THEREFOR

(71) Applicant: SOOCHOW UNIVERSITY, Suzhou, Jiangsu (CN)

(72) Inventors: Aijuan Gu, Jiangsu (CN); Yuanzhen Wang, Jiangsu (CN); Guozheng Liang, Jiangsu (CN); Li Yuan, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/328,008

(22) PCT Filed: May 28, 2015

(86) PCT No.: PCT/CN2015/080144
§ 371 (c)(1),
(2) Date: Jan. 20, 2017

(87) PCT Pub. No.: WO2016/011847
PCT Pub. Date: Jan. 28, 2016

(65) Prior Publication Data
US 2017/0204228 A1    Jul. 20, 2017

(30) Foreign Application Priority Data
Jul. 23, 2014 (CN) .......................... 2014 1 0352307

(51) Int. Cl.
*C08G 79/12* (2006.01)
*C08G 77/398* (2006.01)
(Continued)

(52) U.S. Cl.
CPC ............. *C08G 79/12* (2013.01); *C08G 77/18* (2013.01); *C08G 77/26* (2013.01); *C08G 77/398* (2013.01)

(58) Field of Classification Search
None
See application file for complete search history.

(56) References Cited

U.S. PATENT DOCUMENTS

| | | | |
|---|---|---|---|
| 5,717,051 A * | 2/1998 | Hiraoka | C03C 14/00 428/429 |
| 6,017,844 A | 1/2000 | Wu et al. | |
| 2006/0235166 A1 * | 10/2006 | Tsang | C08G 77/60 525/366 |

FOREIGN PATENT DOCUMENTS

| CN | 101613476 A | 12/2009 |
|---|---|---|
| CN | 101659748 A | 3/2010 |

(Continued)

OTHER PUBLICATIONS

Wang et al. "New Bismaleimide Resin Toughened by In Situ Ring-Opening Polymer of Cyclic Butylene Terephthalate Oligomer with Unique Organotin Initiator". Ind. Eng. Chem. Res. 2015, 54,5948-5958. (Year: 2015).*

*Primary Examiner* — Robert S Loewe
(74) *Attorney, Agent, or Firm* — SZDC Law P.C.

(57) ABSTRACT

A method of preparing an organotin containing hyperbranched polysiloxane structure includes the following steps: (1) by weight, 0.5-1.5 portions of hyperbranched polysiloxane with reactive functional groups is dissolved in 50-100 portions of an alcohol solvent, to obtain a solution A; (2) by weight, 0.5-0.9 portions of a tin-based initiator and 50-100 portions of the alcohol solvent are mixed to obtain a solution B, wherein said tin-based initiator is selected from dihydroxy butyl tin chloride, butyl tin trichloride, and dibutyl tin dichloride; and (3) dropping the solution B into the (Continued)

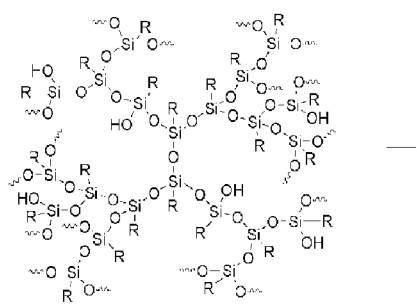
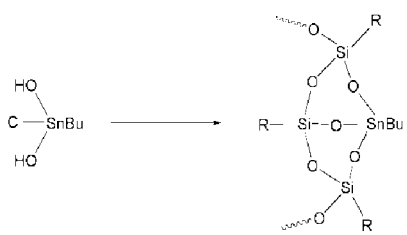

R— = CH$_2$CH$_2$CH$_2$NH$_2$    R$_1$— = CH$_2$CH$_2$CH$_2$CH$_3$ solution A at the temperature of 0° C.-60° C., reacting for 3-6 h, filtering and drying to obtain the organotin containing hyperbranched polysiloxane structure.

4 Claims, 3 Drawing Sheets

(51) Int. Cl.
*C08G 77/26* (2006.01)
*C08G 77/18* (2006.01)

(56) References Cited

FOREIGN PATENT DOCUMENTS

| | | |
|---|---|---|
| CN | 101724226 A | 6/2010 |
| CN | 102199294 A | 9/2011 |
| CN | 104130416 A | 11/2014 |

* cited by examiner

ORGANOTIN CONTAINING HYPERBRANCHED POLYSILOXANE STRUCTURE AND PREPARATION METHOD THEREFOR

This application is the national stage application of international application PCT/CN2015/080144, filed on May 28, 2015, which claims priority to Chinese Patent Application No. CN 201410352307.8, filed on Jul. 23, 2014, which is incorporated by reference for all purposes as if fully set forth herein.

TECHNICAL FIELD

The present invention relates to a metal organic compound, in particular to an organotin compound catalyst and the preparation method thereof.

BACKGROUND TECHNOLOGY

Organotin compounds are metal organic compounds formed by the direct combination of tin and carbon. They are widely used in the fields including agriculture, catalytic chemistry, pharmaceutical chemistry, stabilizing agent, antifouling coating, material anticorrosive and textile, and are also important organic synthetic intermediates. It is an important application of organotin compounds to act as a catalyst in the organic reaction, as it has the characteristics of high yield, high selectivity and non-corrosive to reactors. However, there are two major shortcomings when it is applied to the curing of thermosetting resins, one of which is the high activity under low concentration, this feature usually makes the catalytic curing of thermosetting resin runs so fast that is difficult to be controlled, so that the cross-linked structure of the cured product is inhomogeneous, and it is difficult to obtain a cured product with good comprehensive properties as expected. Therefore, the organotin used for the curing of the thermosetting resin should have appropriate reactivity, not high activity. Secondly, the homogeneous dispersion in the resin is a prerequisite for obtaining a cured product having excellent comprehensive properties, whereas the conventional organotin catalyst does not have an active group capable of interacting with the resin.

It is worth mentioning that the toxicity of organotin compounds has been fully confirmed, this shortcoming restricts the wide applications of organotin compounds. The research of low toxic organotin-based initiator has become a common concern. Previous researches showed that the introduction of silicon atom could reduce the toxicity of organotin compounds (literature: Patai S, Rappoport Z. Bioorganosilicon Chemistry [M]. John Wiley and Sons: 1989, 1143-1168.). However, the content of silicon in available silicon-containing organotin is very low and the tin loading is still high.

In summary, there is important application value to develop a new low-toxic organotin that can be used for the curing reaction of thermosetting resins.

SUMMARY OF THE INVENTION

The present invention provides a new low-toxic organotin suitable for applying in curing of thermosetting resins, to overcome the deficiencies of high toxicity and no reactive bases for reacting with resins of the common organic tin. The preparation method thereof is also provided.

In order to achieve the above-mentioned object, the present invention provides the technical scheme as:

A preparation method of organotin containing hyperbranched polysiloxane structure, comprising following steps:

(1) by weight, 0.5-1.5 portions of hyperbranched polysiloxane with reactive functional groups is dissolved in 50-100 portions of alcohol solvent, to obtain a solution A;

(2) by weight, 0.5-0.9 portions of a tin-based initiator and 50-100 portions of an alcohol solvent are mixed to obtain a solution B, said tin-based initiator is selected from dihydroxy butyl tin chloride, butyl tin trichloride, or dibutyl tin dichloride;

(3) dropping the solution B into the solution A at the temperature of 0° C.-60° C., reacting for 3-6 h, filtering and drying to obtain an organotin containing hyperbranched polysiloxane structure.

In the present invention, the molecular weight of the hyperbranched polysiloxane with reactive functional groups is 3500 to 9312; and the active functional group is selected from an amino group, an epoxy group, a vinyl group, or a combination thereof. Said alcohol is isopropanol, ethanol, or a combination thereof.

The invention also provides an organotin containing hyperbranched polysiloxane structure obtained by the preparation method described before.

Compared with the prior arts, the present invention has following beneficial effects:

1. Amino-terminated hyperbranched polysiloxane, which has good biocompatibility, was introduced into the molecule of organotin-based initiator, and then the content of tin is only 0.09-0.32 wt %; besides, there is no halogen in the new organotin-based initiator prepared herein. The unique structure of the new organotin-based initiator has low toxicity.

2. The hyperbranched polysiloxane introduced in the new organotin-based initiator has amino-terminal groups, these amino groups can react with a variety of functional groups, so this provides the new organotin-based initiator with effective dispersion in resins.

3. The introduction of hyperbranched polysiloxane decreases the catalytic activity, and it is beneficial to get suitably catalyzing effect on curing resins.

4. The reactivity of organotin-based initiator can be adjusted through controlling the molecular weight of hyperbranched polysiloxane as well as the proportion ratio between hyperbranched polysiloxane and organotin-based initiator, and thus a series of organotin-based initiators with different chemical reactivity were obtained.

5. The structure of hyperbranched polysiloxane can help the thermosetting resins get better performances, such as toughness and thermal stability.

6. In the invention, the preparation method is simple and has a great application prospect.

DETAILED DESCRIPTION OF THE INVENTION

The technical solution of the present invention will be described in further details with reference to the drawings and examples.

Example 1

The synthesis of an organotin with amino-terminated hyperbranched polysiloxane follows the steps described below.

1. The synthesis of amino-terminated hyperbranched polysiloxane.

22.1 g 3-triethoxysilylpropylamine (APTES) and 2.0 g distilled water are homogeneously mixed at room temperature. After 15 min of magnetic stirring, the solution is slowly heated to 60° C. and reacting for 4 h. After the reaction is completed, through vacuum drying to steam out ethanol, a transparent viscous amino-terminated hyperbranched polysiloxane is obtained. Its molecular weight is 6918.

2. The synthesis of organotin with amino-terminated hyperbranched polysiloxane.

1.34 g amino-terminated hyperbranched polysiloxane obtained in step 1 is dissolved in 50 mL isopropanol to form a solution; the solution is slowly heated to 55° C., and then into which 50 mL isopropanol containing 0.7 g dihydroxy butyl tin chloride (BCD) is dropped, then the solution is remained at 55° C. while stirring for 5 h. After filtering and drying, an organotin containing amino-terminated hyperbranched polysiloxane is obtained, in which the tin content is 0.121 wt %. The synthesis procedure, infrared spectroscopy, $^1$H NMR and $^{29}$Si NMR spectra of the organotin is shown in FIGS. 1, 2, 3 and 4.

Figure 1:
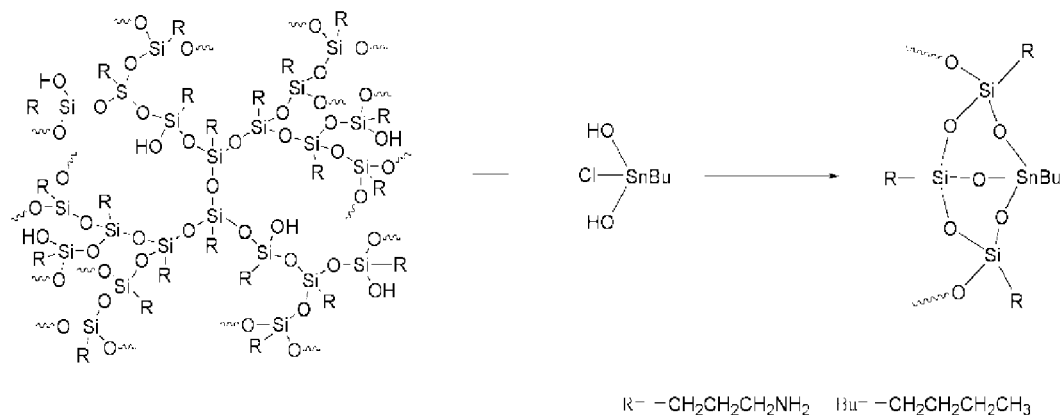
FIG. 1 illustrates the structure of the organotin with hyperbranched polysiloxane.

Referring to FIG. 1, which is a schematic representation of the synthesis of organotin with amino-terminated hyperbranched polysiloxane provide in this example. It can be seen that the organotin with amino-terminated hyperbranched polysiloxane is halogen-free.

Figure 2:
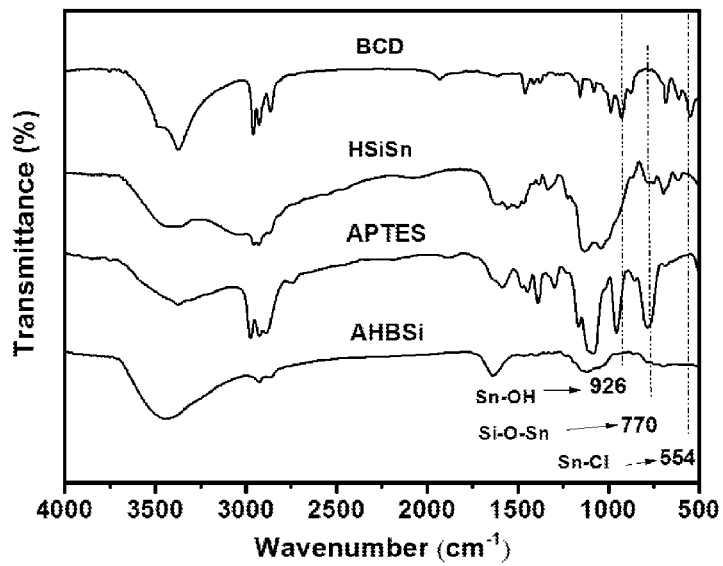
FIG. 2 is the fourier transform infrared (FTIR) spectra of 3-triethoxysilylpropylamine, amino-terminated hyperbranched polysiloxane, dihydroxy butyl tin chloride, and organotin with hyperbranched polysiloxane prepared in Example 1.

FIG. 2 gives the FTIR spectra of 3-triethoxysilylpropylamine (APTES), amino-terminated hyperbranched polysiloxane (AHBSi), dihydroxy butyl tin chloride (BCD) and organotin with amino-terminated hyperbranched polysiloxane (HsiSn). There is a broad and overlapped absorption band attributing to Si—O—Si groups from 1000 to 1200 cm$^{-1}$ in the spectrum of AHBSi; meanwhile, a broad and overlapped absorption band appeared at 3419 cm$^{-1}$ indicating the hydrolysis of ethoxy to form silanol.

In addition, the absorption peaks at 926 cm$^{-1}$ (for Si—OH of AHBSi and Sn—OH of BCD) and 554 cm$^{-1}$ (Sn—Cl of BCD) are not observed, instead, a new absorption peak at 770 cm$^{-1}$ (Si—O—Sn) appears, clearly manifesting the synthesis of HsiSn.

Figure 3:
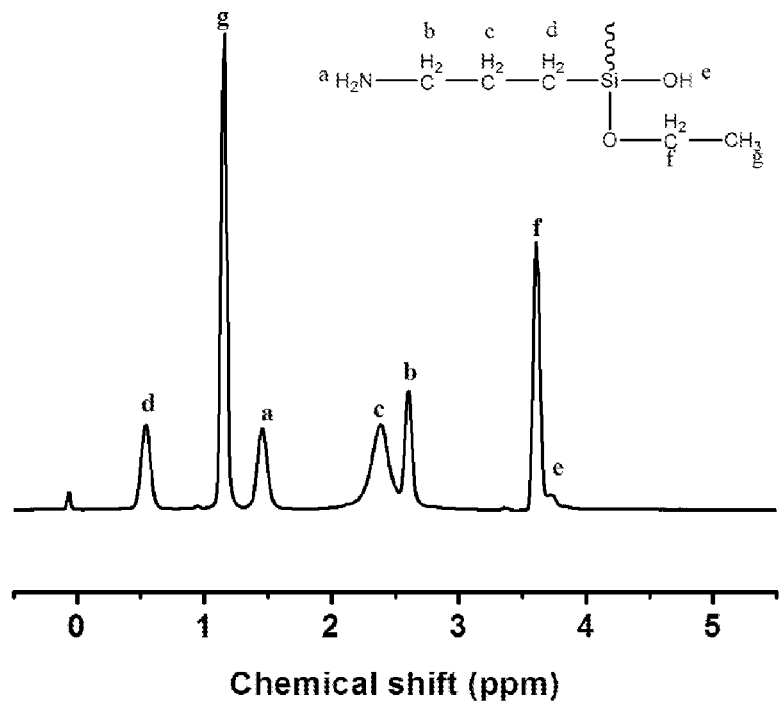
FIG. 3 shows the $^1$H NMR spectrum of amino-terminated hyperbranched polysiloxane prepared in Example 1.

FIG. 3 shows the $^1$H NMR spectrum of AHBSi, the chemical shift at 3.7 ppm is assigned to the —OH group, this further validates the polycondensation. In addition, the chemical shift of amine at 1.5 ppm is also observed.

Figure 4:
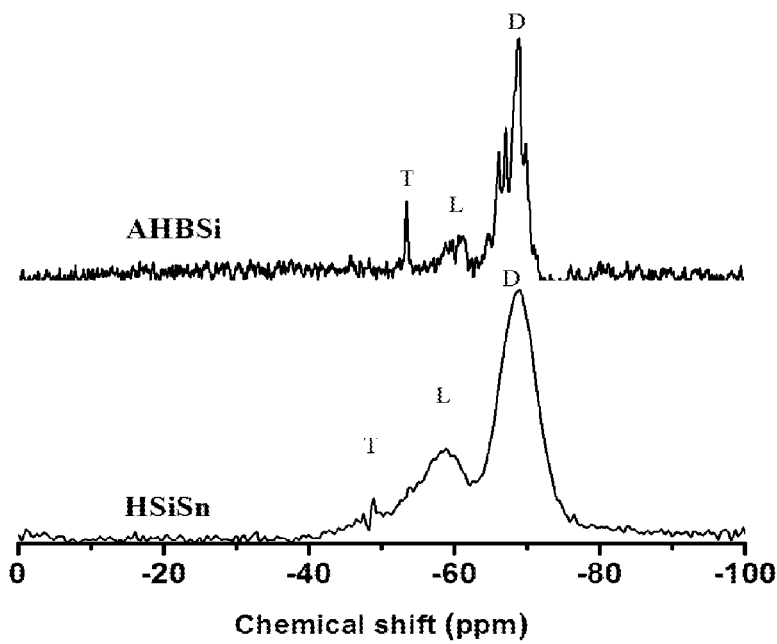
FIG. 4 shows $^{29}$Si NMR spectra of amino-terminated hyperbranched polysiloxane and the new organotin (HSiSn) prepared in Example 1.

FIG. 4 shows the $^{29}$Si NMR spectra of AHBSi and HsiSn obtained in this example, the spectrum of HsiSn shows the chemical shifts representing dendritic unit, linear unit and terminal unit, suggesting that HsiSn has hyperbranched structure. Especially, compared with the T shift (−53.60 ppm) in the spectrum of AHBSi, that of HsiSn appears at −48.71 ppm due to the condensation between AHBSi and butyltin chloride dihydroxide. The degree of branch (DB) of AHBSi was calculated to be 0.80.

From the results of FIG. 2-4, it is confirmed that AHBSi was successfully synthesized.

From the results of FIGS. 2 and 4, it can be confirmed that HsiSn was obtained.

Figure 5:
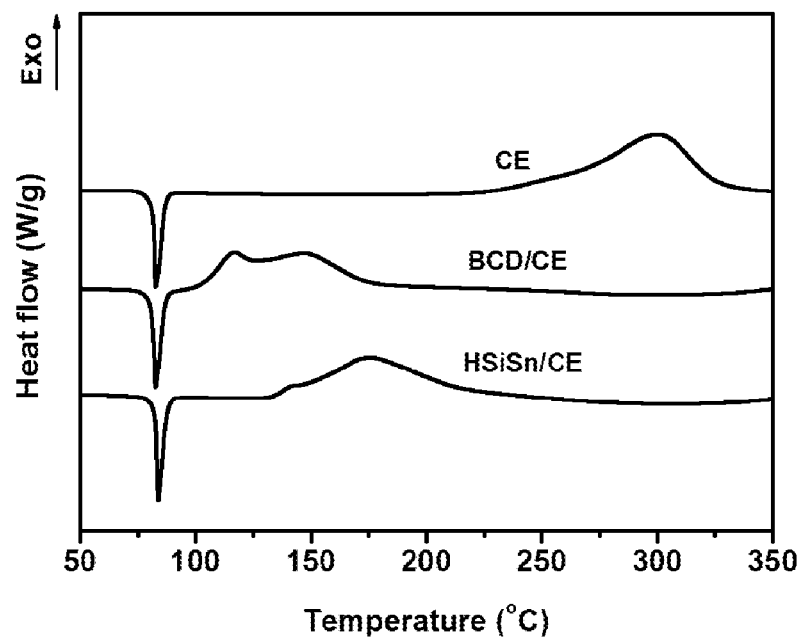
FIG. 5 gives DSC curves of cyanate ester prepolymer with dihydroxy butyl tin chloride (BCD/CE), and that with the organotin (HSiSn/CE) prepared in Example 1.
Figure 6:
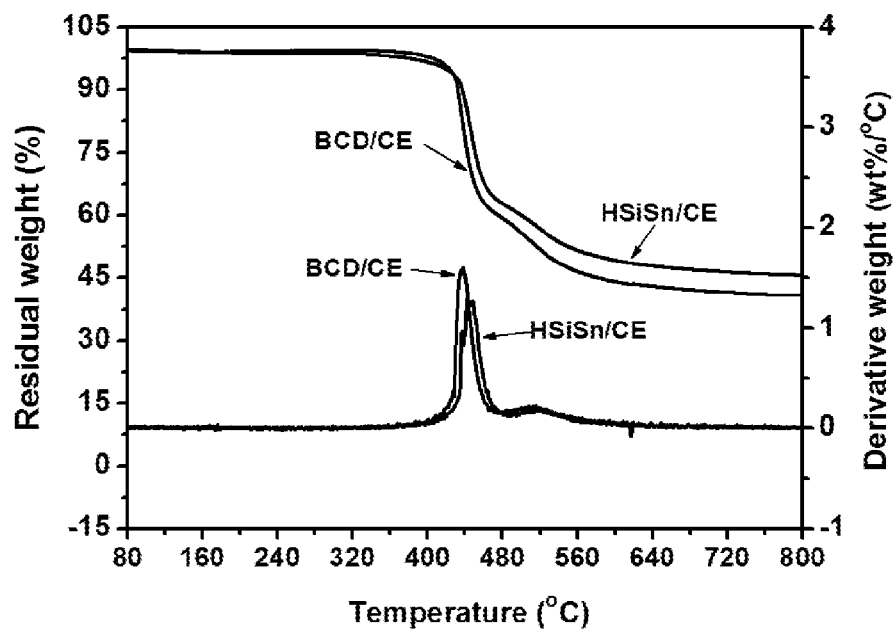
FIG. 6 shows TG and DTG curves of cured cyanate ester resin with dihydroxy butyl tin chloride (BCD/CE), and that with the new organotin (HSiSn/CE) prepared in Example 1.

On the base of successful synthesis of HsiSn, the modified cyanate ester (CE) resin was prepared according to following process. Specifically, 100 g 2,2'-bis(4-cyanatophenyl)propane (commercial CE monomer of bisphenol A type) was heated to 90° C. to get completely molten CE, into which 0.064 g HsiSn obtained above was added; after stirring at 90° C. for 20 min, a modified CE prepolymer (HsiSn/CE) was obtained. The DSC curve of HsiSn/CE prepolymer with a heating rate of 10° C./min under a nitrogen atmosphere is shown in FIG. 5. The prepolymer was put into a preheated mold and thoroughly degassed to remove entrapped air at 120° C. in a vacuum oven, and then the mold was put into an oven for curing and postcuring following the protocol of 150° C./2 h+180° C./2 h+200° C./2 h+220° C./2 h+240° C./4 h, successively, to obtain a cured resin. FIG. 6 shows the TG and DTG curves of the cured HsiSn/CE resin with a flow rate of 100 mL/min and a heating rate of 10° C./min. The temperature at which the weight loss of a sample reaches 5 wt % is regarded as the initial decomposition temperature ($T_{di}$) the char yield at 800° C. is coded as $Y_c$.

The CE resin modified by BCD was also prepared using following steps. 100 g 2,2'-bis(4-cyanatophenyl)propane is heated to 90° C. to get a completely molten liquid CE, into which 0.032 g BCD was added; after stirring at 90° C. for 20 min, a BCD/CE prepolymer was obtained. FIG. 5 gives the DSC curve of BCD/CE prepolymer with a heating rate of 10° C./min under a nitrogen atmosphere. The BCD/CE prepolymer was put into a preheated mold and thoroughly degassed to remove entrapped air at 120° C. in a vacuum oven, and then the mold was put into an oven for curing and postcuring following the protocol of 150° C./2 h+180° C./2 h+200° C./2 h+220° C./2 h+240° C./4 h, successively, to obtain a cured resin. FIG. 6 shows the TG and DTG curves of cured BCD/CE resin with a flow rate of 100 mL/min and a heating rate of 10° C./min.

By contrast the curves in FIG. 5, it can be seen that in the curve of BCD/CE prepolymer, a curing peak appears just behind the melting peak, so the gap between the melting and curing temperatures is narrow, and this phenomenon means a relatively poor processing feature because it is generally to get cured structure without uniform structure and good performance. In addition, the curve of BCD/CE prepolymer shows multiple curing peaks, indicating that BCD has poor dispersion in CE resin, so there are different parts that have different curing reactivity. While attractively, this poor phenomenon does not appear in the DSC curve of HsiSn/CE prepolymer. In detail, the temperature gap between the curing peak and the melting peak is wide, so there is a wide processing window for HsiSn/CE prepolymer. In addition, compared with the curing peak in the DSC curve of CE, that of HsiSn/CE prepolymer shows an obvious shift toward lower temperature, demonstrating that HsiSn has an appropriate and good catalytic reactivity.

FIG. 6 gives TG and DTG curves of cured BCD/CE and HSiSn/CE resins. The two cured resins have almost same initial decomposition temperatures ($T_{di}$, 420° C.), but they have an obviously different char yields, the char yields of HSiSn/CE and BCD/CE resins are 45.6 wt % and 40.8 wt %, respectively. The temperature at which showing the maximum decomposition rate of HSiSn/CE resin is 437° C. and that of BCD/CE resin is 443° C. All these results demonstrate that HSiSn/CE resin has better thermal stability than BCD/CE resin. This attractive result can be contributed to the outstanding thermal stability and catalytic reactivity of hyperbranched polysiloxane.

Example 2

1. The synthesis of epoxy-terminated hyperbranched polysiloxane.

47.3 g 3-glycidoxypropyltrimethoxysilane, 4.0 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at 50° C. with stirring for 4 h, and then the resultant product was put into a vacuum oven to give off ethanol. Finally, a transparent and viscous liquid was obtained, which was epoxy-terminated hyperbranched polysiloxane, and the molecular weight is 7500.

2. The synthesis of new organotin.

1.34 g epoxy-terminated hyperbranched polysiloxane was dissolved in 50 mL isopropanol to form a solution A; after being maintained at room temperature for 15 min, the solution A was heated to 55° C., and then into which 50 mL isopropanol which contained 0.7 g dihydroxy butyl tin chloride was added to get a mixture B. The mixture B was stayed at 55° C. with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.26 wt %.

Example 3

The synthesis of the new organotin follows the steps described below.

1. The synthesis of vinyl-terminated hyperbranched polysiloxane.

28.0 g vinyltris(2-methoxyethoxy)silane, 1.98 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was vinyl-terminated hyperbranched polysiloxane, and the molecular weight is 4200.

2. The synthesis of the new organotin.

0.5 g vinyl-terminated hyperbranched polysiloxane was dissolved in 50 mL isopropanol; after being maintained at room temperature for 15 min, the solution was heated to 55° C., and then into which 50 mL isopropanol which contained 0.5 g dihydroxy butyl tin chloride was added to get a mixture B. The mixture B was stayed at 55° C. with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.32 wt %.

Example 4

The synthesis of the new organotin follows the steps described below.

1. The synthesis of epoxy-terminated hyperbranched polysiloxane.

45.3 g 3-glycidoxypropyltrimethoxysilane, 4.0 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was epoxy-terminated hyperbranched polysiloxane, and the molecular weight is 7140.

2. The synthesis of the new organotin.

1.25 g epoxy-terminated hyperbranched polysiloxane was dissolved in 60 mL isopropanol; after being maintained at room temperature for 15 min, the solution was heated to 55° C., and then into which 50 mL isopropanol which contained 0.5 g dihydroxy butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.11 wt %.

Example 5

The synthesis of the new organotin follows the steps described below.

1. The synthesis of amino-terminated hyperbranched polysiloxane.

17.9 g 3-triethoxysilylpropylamine, 2.2 g distilled water, and 100 mL methanol were put into a three-necked flask equipped with a thermometer and condenser to form a solution. After being maintained at room temperature for 15 min, the solution was heated to 60° C. and maintained at that temperature with stirring for 4 h, and then the resultant product was put into a vacuum oven to give off methanol. Finally, a transparent and viscous liquid was obtained, which was amino-terminated hyperbranched polysiloxane, signed as AHBSi, and the molecular weight is 5120.

2. The synthesis of the new organotin.

0.90 g AHBSi was dissolved in 50 mL ethanol; after being maintained at room temperature for 15 min, the solution was cooled to 5° C., and then into which 100 mL ethanol which contained 0.9 g dibutyl tin dichloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.3 wt %.

Example 6

The synthesis of the new organotin follows the steps described below.

1. The synthesis of epoxy-terminated hyperbranched polysiloxane.

47.3 g 3-glycidoxypropyltrimethoxysilane, 3.5 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was epoxy-terminated hyperbranched polysiloxane, and the molecular weight is 7630.

2. The synthesis of the new organotin.

1.4 g epoxy-terminated hyperbranched polysiloxane was dissolved in 80 mL isopropanol; after being maintained at room temperature for 15 min, the solution was cooled to 5° C., and then into which 100 mL ethanol which contained 0.6 g dibutyl tin dichloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.256 wt %.

Example 7

The synthesis of the new organotin follows the steps described below.

1. The synthesis of vinyl-terminated hyperbranched polysiloxane.

27.0 g vinyltris(2-methoxyethoxy)silane, 1.98 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was vinyl-terminated hyperbranched polysiloxane, and the molecular weight is 3800.

2. The synthesis of the new organotin.

0.5 g vinyl-terminated hyperbranched polysiloxane was dissolved in 50 mL ethanol; after being maintained at room temperature for 15 min, the solution was heated to 60° C., and then into which 50 mL isopropanol which contained 0.7 g dihydroxy butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.24 wt %.

Example 8

The synthesis of the new organotin follows the steps described below.

1. The synthesis of epoxy-terminated hyperbranched polysiloxane.

40.3 g 3-glycidoxypropyltrimethoxysilane, 4.0 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was epoxy-terminated hyperbranched polysiloxane, and the molecular weight is 6930.

2. The synthesis of the new organotin.

1.1 g epoxy-terminated hyperbranched polysiloxane was dissolved in 50 mL ethanol; after being maintained at room temperature for 15 min, the solution was cooled to 5° C., and then into which 100 mL ethanol which contained 0.8 g dihydroxy butyl tin chloride was added to get a mixture B. The mixture B was stayed at that temperature with stirring for 5 h to get a crude product.

The crude product was filtrated, and the resultant filter cake was dried in vacuo to obtain a new organotin containing hyperbranched polysiloxane, which was designed as HSiSn. The tin content of HSiSn is 0.189 wt %.

Example 9

The synthesis of the new organotin follows the steps described below.

1. The synthesis of amino-terminated hyperbranched polysiloxane.

22.1 g 3-triethoxysilylpropylamine, 1.9 g distilled water, and 100 mL methanol were put into a three-necked flask equipped with a thermometer and condenser to form a solution. After being maintained at room temperature for 15 min, the solution was heated to 60° C. and maintained at that temperature with stirring for 4 h, and then the resultant product was put into a vacuum oven to give off methanol. Finally, a transparent and viscous liquid was obtained, which was amino-terminated hyperbranched polysiloxane, signed as AHBSi, and the molecular weight is 6708.

2. The synthesis of the new organotin.

1.3 g AHBSi was dissolved in 100 mL ethanol; after being maintained at room temperature for 15 min, the solution was heated to 55° C., and then into which 90 mL isopropanol which contained 0.6 g dihydroxy butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.145 wt %.

Example 10

The synthesis of the new organotin follows the steps described below.

1. The synthesis of amino-terminated hyperbranched polysiloxane.

19.7 g 3-triethoxysilylpropylamine, 2.6 g distilled water, and 100 mL methanol were put into a three-necked flask equipped with a thermometer and condenser to form a solution. After being maintained at room temperature for 15 min, the solution was heated to 60° C. and maintained at that temperature with stirring for 4 h, and then the resultant product was put into a vacuum oven to give off methanol. Finally, a transparent and viscous liquid was obtained, which was amino-terminated hyperbranched polysiloxane, signed as AHBSi, and the molecular weight is 9312.

2. The synthesis of the new organotin.

1.27 g AHBSi was dissolved in 70 mL ethanol; after being maintained at room temperature for 15 min, the solution was cooled to 0° C., and then into which 100 mL isopropanol which contained 0.6 g butyl tin chloride 0.90 g AHBSi was dissolved in 50 mL ethanol, after being maintained at room temperature for 15 min, the solution was cooled to 5° C., and then into which 100 mL ethanol which contained 0.9 g dibutyl tin dichloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.135 wt %.

Example 11

The synthesis of the new organotin follows the steps described below.
1. The synthesis of epoxy-terminated hyperbranched polysiloxane.
50.3 g 3-glycidoxypropyltrimethoxysilane, 4.0 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was epoxy-terminated hyperbranched polysiloxane, and the molecular weight is 7800.
2. The synthesis of the new organotin.
1.4 g epoxy-terminated hyperbranched polysiloxane was dissolved in 100 mL isopropanol; after being maintained at room temperature for 15 min, the solution was cooled to 5° C., and then into which 90 mL ethanol which contained 0.8 g dibutyl tin dichloride 0.90 g AHBSi was dissolved in 50 mL ethanol, after being maintained at room temperature for 15 min, the solution was cooled to 5° C., and then into which 100 mL ethanol which contained 0.9 g dibutyl tin dichloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.142 wt %.

Example 12

The synthesis of the new organotin follows the steps described below.
1. The synthesis of vinyl-terminated hyperbranched polysiloxane.
29.0 g vinyltris(2-methoxyethoxy)silane, 1.98 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was vinyl-terminated hyperbranched polysiloxane, and the molecular weight is 5000.
2. The synthesis of the new organotin.
1.4 g vinyl-terminated hyperbranched polysiloxane was dissolved in 100 mL isopropanol; after being maintained at room temperature for 15 min, the solution was cooled to 0° C., and then into which 50 mL isopropanol which contained 0.7 g butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.171 wt %.

Example 13

The synthesis of the new organotin follows the steps described below.
1. The synthesis of vinyl-terminated hyperbranched polysiloxane.
24.0 g vinyltris(2-methoxyethoxy)silane, 1.98 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was vinyl-terminated hyperbranched polysiloxane, and the molecular weight is 3500.
2. The synthesis of the new organotin.
1.2 g vinyl-terminated hyperbranched polysiloxane was dissolved in 50 mL isopropanol; after being maintained at room temperature for 15 min, the solution was cooled to 5° C., and then into which 50 mL isopropanol which contained 0.5 g dibutyl tin dichloride was added to get a mixture B. The mixture B was stayed at that temperature with stirring for 3 h to get a crude product. The crude product was filtrated, and the resultant filter cake was dried in vacuo to obtain a new organotin containing hyperbranched polysiloxane, which was designed as HSiSn. The tin content of HSiSn is 0.175 wt %.

Example 14

The synthesis of the new organotin follows the steps described below.
1. The synthesis of epoxy-terminated hyperbranched polysiloxane.
47.3 g 3-glycidoxypropyltrimethoxysilane, 3.5 g distilled water, and 100 mL ethanol were put into a three-necked flask equipped with a thermometer and condenser to form a solution, and then 1 mL HCl (36.5%) was added into the flask. After being maintained at room temperature for 15 min, the solution was heated to 50° C. and maintained at that temperature with stirring for 4 h, and then the resultant product was put into a vacuum oven to give off ethanol. Finally, a transparent and viscous liquid was obtained, which was epoxy-terminated hyperbranched polysiloxane, and the molecular weight is 7630.
2. The synthesis of the new organotin.
1.4 g epoxy-terminated hyperbranched polysiloxane was dissolved in 80 mL isopropanol; after being maintained at room temperature for 15 min, the solution was cooled to 0° C., and then into which 100 mL ethanol which contained 0.6 g butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.184 wt %.

Example 15

0.7 g epoxy-terminated hyperbranched polysiloxane from the Example 14 and 0.7 g vinyl-terminated hyperbranched polysiloxane from the Example 12 were dissolved in 80 mL isopropanol; after being maintained at room temperature for 15 min, the solution was cooled to 0° C., and then into which 100 mL ethanol which contained 0.6 g butyl tin chloride was added to get a mixture B. The mixture B was stayed at that temperature with stirring for 5 h to get a crude product. The crude product was filtrated, and the resultant filter cake was dried in vacuo to obtain a new organotin containing hyperbranched polysiloxane, which was designed as HSiSn. The tin content of HSiSn is 0.126 wt %.

What is claimed is:

1. A method of preparing an organotin containing hyperbranched polysiloxane structure comprising the following steps:
   (1) by weight, 0.5-1.5 portions of hyperbranched polysiloxane with reactive functional groups is dissolved in 50-100 portions of an alcohol solvent, to obtain a solution A;
   (2) by weight, 0.5-0.9 portions of a tin-based initiator and 50-100 portions of the alcohol solvent are mixed to obtain a solution B, wherein said tin-based initiator is selected from dihydroxy butyl tin chloride, butyl tin trichloride, and dibutyl tin dichloride; and
   (3) dropping the solution B into the solution A at the temperature of 0° C.-60° C., reacting for 3-6 h, filtering and drying to obtain the organotin containing hyperbranched polysiloxane structure.

2. The method according to claim 1, wherein said hyperbranched siloxane with active functional groups has a molecular weight of 3500 to 9312, and the active functional groups are selected from an amino group, an epoxy group, a vinyl group, and a combination thereof.

3. The method according to claim 1, wherein said alcohol solution is isopropanol, ethanol, or a combination thereof.

4. An organotin containing hyperbranched polysiloxane structure obtained by the method according to claim 1.

* * * * *